(12) United States Patent
Appenzeller et al.

(10) Patent No.: US 7,370,202 B2
(45) Date of Patent: May 6, 2008

(54) SECURITY DEVICE FOR CRYPTOGRAPHIC COMMUNICATIONS

(75) Inventors: Guido Appenzeller, Menlo Park, CA (US); Terence Spies, San Mateo, CA (US); Xavier Boyen, Palo Alto, CA (US)

(73) Assignee: Voltage Security, Inc., Palo Alto, CA (US)

( * ) Notice: Subject to any disclaimer, the term of this patent is extended or adjusted under 35 U.S.C. 154(b) by 164 days.

(21) Appl. No.: 10/980,393

(22) Filed: Nov. 2, 2004

(65) Prior Publication Data

US 2006/0095771 A1 May 4, 2006

(51) Int. Cl.
*H04L 9/00* (2006.01)

(52) U.S. Cl. .................. 713/171; 713/194; 713/179; 726/5; 726/19; 380/44; 380/277

(58) Field of Classification Search ................. 713/171
See application file for complete search history.

(56) References Cited

U.S. PATENT DOCUMENTS

| | | | |
|---|---|---|---|
| 5,550,919 A | 8/1996 | Kowalski | |
| 5,825,882 A | 10/1998 | Kowalksi et al. | |
| 5,910,989 A | 6/1999 | Naccache | |
| 6,459,791 B1 | 10/2002 | M'Raihi et al. | |
| 6,655,585 B2 | 12/2003 | Shinn | |
| 6,792,536 B1 * | 9/2004 | Teppler | 713/178 |
| 6,834,795 B1 | 12/2004 | Rasmussen et al. | |
| 6,839,840 B1 | 1/2005 | Cooreman | |
| 6,914,986 B2 | 7/2005 | Handschuh | |
| 2003/0081785 A1 * | 5/2003 | Boneh et al. | 380/277 |
| 2003/0084311 A1 * | 5/2003 | Merrien et al. | 713/191 |
| 2003/0172272 A1 * | 9/2003 | Ehlers et al. | 713/170 |
| 2004/0172531 A1 * | 9/2004 | Little et al. | 713/155 |
| 2004/0240666 A1 * | 12/2004 | Cocks | 380/44 |

* cited by examiner

*Primary Examiner*—Emmanuel L. Moise
*Assistant Examiner*—Shewaye Gelagay
(74) *Attorney, Agent, or Firm*—G. Victor Treyz

(57) ABSTRACT

Cryptographic systems and methods are provided in which authentication operations, digital signature operations, and encryption operations may be performed. Authentication operations may be performed using authentication information. The authentication information may be constructed using a symmetric authentication key or a public/private pair of authentication keys. Users may digitally sign data using private signing keys. Corresponding public signing keys may be used to verify user signatures. Identity-based-encryption (IBE) arrangements may be used for encrypting messages using the identity of a recipient. IBE-encrypted messages may be decrypted using appropriate IBE private keys. A smart card, universal serial bus key, or other security device having a tamper-proof enclosure may use the authentication information to obtain secret key information. Information such as IBE private key information, private signature key information, and authentication information may be stored in the tamper-proof enclosure.

2 Claims, 7 Drawing Sheets

SECURITY DEVICE FOR CRYPTOGRAPHIC COMMUNICATIONS

BACKGROUND OF THE INVENTION

This invention relates to cryptography, and more particularly, to security devices for use in cryptographic systems and to methods for using such security devices.

A variety of cryptographic techniques are used to encrypt data and to create digital signatures. With symmetric key cryptographic systems, a pair of users who desire to exchange data securely use a shared symmetric key. With this type of approach, a sender of a message uses the same key to encrypt the message that a recipient of the message uses to decrypt the message. Symmetric key systems require that each sender and recipient exchange the shared key in a secure manner.

Public key systems may also be used to exchange messages securely. With public-key cryptographic systems, two types of keys are used—public keys and private keys. A sender of a message may encrypt the message using the public key of a recipient. The recipient may use a corresponding private key to decrypt the message.

One conventional public-key cryptographic system that is in use is the RSA cryptographic system. Each user in this system has a unique public key and a unique private key. A sender may obtain the public key of a given recipient from a key server over the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message. Public key encryption systems such as the RSA system that use this type of approach are referred to as PKI (public-key infrastructure) cryptographic systems.

Identity-based-encryption (IBE or IB) public-key cryptographic systems have also been proposed. As with PKI cryptographic systems, a sender in an IBE cryptosystem may encrypt a message for a given recipient using the recipient's public key. The recipient may then decrypt the message using the recipient's corresponding private key. The recipient can obtain the private key from a private key generator associated with the recipient.

Unlike PKI schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

Public key cryptographic systems may be used to produce digital signatures. A recipient of a message that has been digitally signed can use the digital signature to verify the identity of the message's sender and to confirm that the message has not been altered during transit.

In a typical digital signature arrangement, a sender uses a cryptographic hash function to produce a message digest. The message digest is much smaller than the original message, but is still unique to the message for practical purposes. The sender then uses the sender's private key to sign the message digest. The process of signing the message digest uses a mathematical operation that can only be performed by the sender who possesses the private key. The message and signed message digest (the "digital signature") may then be sent to a recipient.

The recipient of the digitally-signed message can apply the same hash function to the received message to produce a message digest. Using the public key of the sender, the recipient can attempt to verify the signed version of the message digest that the recipient has received from the sender. The verification procedure uses the sender's public key in a mathematical operation to determine whether the signature was indeed created from the same message digest using the correct private key. If the verification function is successful, the signed version of the message digest will be proven to originate from the message digest that the recipient has produced by applying the hash function directly to the message. A successful verification operation therefore allows the recipient to confirm the true authorship of the message and to confirm that the message has not been altered.

By using both public key signatures and public key encryption, messages can be sent securely and authorship and message authenticity can be verified.

PKI systems are available in which PKI private keys are stored on a portable security device such as a smart card. When a sender desires to encrypt or digitally sign a message, the sender can insert the smart card into a computer. A PKI private key from the security device can then be used to perform the desired cryptographic operation. Because smart cards are small and portable, a sender can easily transfer a smart card to different locations.

With conventional arrangements, it is not possible to use IBE information with smart cards. There are also difficulties associated with accurately and securely distributing private key information to portable devices such as smart cards.

It is therefore an object of the present invention to provide improved security device arrangements for PKI and IBE cryptosystems.

SUMMARY OF THE INVENTION

Systems and methods for supporting cryptographic functions involving PKI and IBE operations are provided. Users in the system may have computing equipment such as personal computers, cellular telephones, or handheld computers. The computing equipment may include a security device. The security device may be based on a relatively small hardware platform such as a smart card, universal serial bus (USB) key, or other suitable hardware device. The security device may be portable, so that the user can readily remove the security device from one computer and install it in another. Because the security device can be carried with the user at all times, the user can use the security device as proof of identity regardless of the user's location.

The security device may include secure hardware such as storage and processing circuitry in a tamper-proof enclosure. Keys such as digital signature keys may be generated at least partly using the circuitry of the tamper-proof enclosure. With this type of arrangement, secret key information need not be transmitted off of the security device, thereby preventing possible interception of this information by an attacker.

Authentication information may be stored on the security device. As an example, a user authentication identifier (ID) may be stored on the security device. A symmetric key or private key may be used to digitally sign the authentication ID. Authentication information such as the digitally signed authentication ID may be used by the user as proof of identity.

The user may use the authentication information from the security device to prove the user's identity to a signing key certificate authority. The signing key certificate authority may verify the user's identity and provide a digitally-signed signature certificate to the user over a communications network. The signature certificate may include the user's public signing key and signing identity (ID) and may be digitally signed using the private key of the signing key certificate authority.

The user may ask an identity-based-encryption (IBE) key server to generate a private IBE key for the user. The IBE key server may process the user's authentication information to verify the user's identity and authorization to obtain the IBE private key. If the user is authorized, the IBE private key server may provide the requested IBE private key to the user. For example, the IBE private key server may use the authentication public key of the user to encrypt the IBE private key. The encrypted IBE private key may then be sent to the user, who may use a corresponding authentication private key to decrypt the IBE private key. The decrypted version of the IBE private key may be retained in the tamper-proof enclosure in the security device.

When the user receives an IBE-encrypted message, the IBE private key can be retrieved and used to perform decryption operations.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to cryptographic systems. The invention also relates to smart cards and other security devices and methods for using security devices in cryptographic systems.

Figure 1:
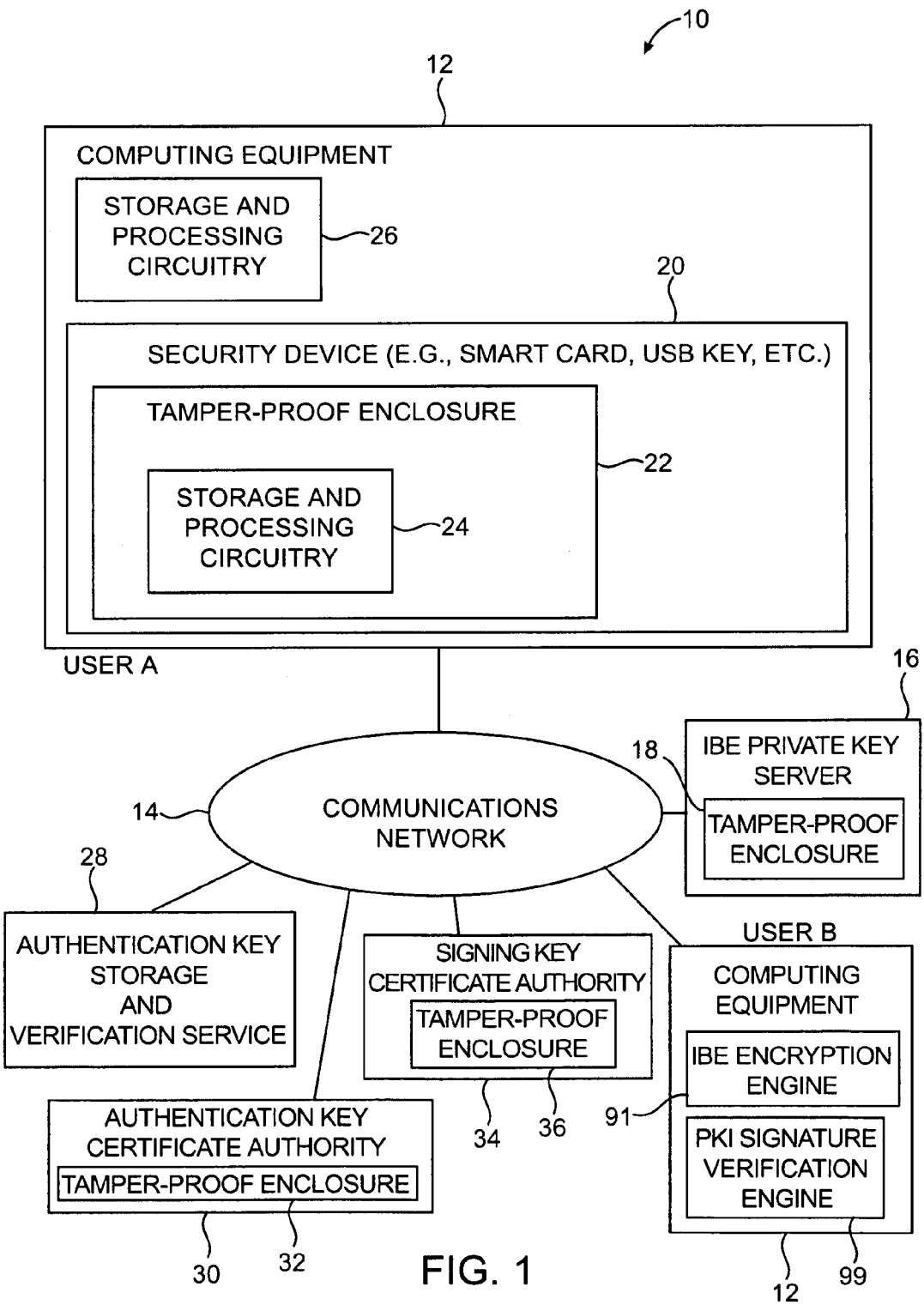
FIG. 1 is a diagram of an illustrative cryptosystem in which a security device is used in accordance with the present invention.

An illustrative cryptographic system in accordance with the present invention is shown in FIG. 1. Users in system 10 may use digital signatures and encryption. The data that is signed and/or encrypted in system 10 is generally referred to as a "message." A message may be any suitable data such as an email message, an instant message, a file, computer code, etc.

Equipment of the type shown in system 10 of FIG. 1 may be used to support secure and digitally-signed communications between senders and recipients. A sender is a user who sends a message. A recipient is a user who receives a message. Because users can generally both send and receive messages, a given user may at one time be a sender and at another time be a recipient. Users may be individuals, organizations, groups of individuals or organizations (e.g., a specific type of employee such as an "administrator" at an organization), or may be systems (e.g., a user may be a autonomously or semi-autonomously operated computer).

In the example of FIG. 1, users A and B are associated with respective computing equipment 12. Users may use computing equipment 12 to send and receive messages over communications network 12. If desired, messages may be passed between users by direct communication (e.g., by linking two pieces of computing equipment 12 directly together over a wired or wireless path) or by transferring a CD or other portable electronic storage media between the computing equipment of the users.

Some user activities in system 10, such as sending person-to-person email messages, involve manual intervention. For example, a person who desires to send a personally-composed text message must type the message before it is encrypted and sent to the appropriate recipient. Other user activities in system 10 may be entirely automated so that no human intervention is generally required. As an example, an organization may use a computer to automatically send messages to each of its customers. In this type of scenario the computer serves as a type of user (i.e., a sender in this example). In the following discussion, the terms "sender," "recipient," and "user" are used to describe both people and their equipment.

Equipment 12 (and the equipment for the other entities in the system) may, for example, include computing equipment such as desktop and portable personal computers, workstations, mainframe computers, networked computers or terminals such as computer terminals that are connected to the Internet using a host computer in a local area network, handheld computers, cellular phones, or any other suitable electronic equipment.

The equipment of FIG. 1 may be interconnected by communications paths in communications network 14. Network 14 may include the Internet and other wide area networks, one or more intranets, local area networks, switched telephone networks, networks such as virtual private networks, networks including dedicated leased lines, networks based on wired or wireless paths, or any other networks formed using any other suitable network technology.

System 10 may have an identity-based-encryption (IBE) key generator such as key generator 16 for generating IBE private keys. IBE private key generator 16 may generate private keys from a master secret s. Key generator 16 may have processing and storage circuitry based on integrated circuits, memory and storage devices, and other circuitry and hardware (collectively "circuitry"). Some or all of this circuitry may be housed in a tamper-proof enclosure 18. For example, the memory or storage circuitry that is used to retain the master secret s and the circuitry used to produce private keys from the master secret s may be housed in a tamper-proof enclosure.

Any suitable tamper-proof arrangement may be used for enclosure 18 and the other tamper-proof enclosures of FIG. 1. Suitable techniques for making an enclosure tamper-proof include incorporating a temperature sensor into the hardware that is being enclosed. If the temperature exceeds a maximum or minimum temperature value, the circuitry in the enclosure can be automatically destroyed (e.g., by applying large currents and/or voltages to some or all of the circuitry and structures on the enclosed hardware). Layers of materials that self destruct upon exposure to electron microscopes may be incorporated into the circuitry. Voltage sensors may be used to detect when an attacker is attempting to tap into certain signal pathways. The circuitry may also be encapsulated in a wire and epoxy package. The wire may be wrapped around the circuitry and embedded in the epoxy. A sensing current may be passed through the wire. If an attacker attempts to open the package, the wire will be severed and the sensing current will be disrupted. As with voltage sensors, temperature sensors, and other sensor arrangements, the encapsulated circuitry can be automatically destroyed when an attack is detected. These are merely illustrative tamper-proof encapsulation arrangements that may be used in system 10 to help ensure the security of the information contained in the enclosures. Any suitable arrangements may be used if desired.

Messages may be encrypted using encryption engines and may be decrypted using decryption engines. With one suitable approach, a message may be encrypted by a sender using the IBE public key of an intended recipient. The IBE public key may, for example, be based on the recipient's email address or other suitable identity information. An IBE encryption engine may be used to encrypt the message at the sender. After the recipient receives the IBE encrypted message, an IBE decryption engine may be used to decrypt the message. Decryption engine operations are performed on the encrypted message using the IBE private key of the recipient. The IBE private key of the recipient and other cryptographic information may be stored on a security device such as security device 20 of FIG. 1. Security device 20 may have a tamper-proof enclosure 22 containing storage and processing circuitry 24. The storage and processing circuitry 24 may be used to handle sensitive cryptographic information such as user A's IBE private key.

Security device 20 may be provided using any suitable format. For example, security device 20 may be provided as a smart card (e.g., a credit-card shaped device with integral processing capabilities or a SIM card as used in cellular telephones), a universal serial bus (USB) key (e.g., a small key-chain-type device mounted on a USB plug), a hardware token, a removable card for a computer such as a PC card, a compact flash card or other memory card, a card or chip for installation in a cellular telephone or handheld computer, or any other suitable electronic device. In general, it is preferable for security device 20 to be relatively small (e.g., the size of a smart card or smaller) and portable. This allows the user of the card to carry the card to different locations. As an example, a user may install the security device 20 in a home computer to handle encrypted and/or digitally signed email messages from home. Later, when traveling on a business trip, the user may install the same security device 20 in a notebook computer to handle encrypted and/or digitally signed email messages from a hotel room.

The computational and storage capabilities of the computing equipment into which security device 20 is installed are provided by storage and processing circuitry such as storage and processing circuitry 26, as shown in FIG. 1. Storage and processing circuitry 26 is generally not enclosed in a tamper-proof enclosure to avoid excessive cost and complexity.

PKI and IBE cryptographic algorithms may be used for encryption and decryption operations in system 10. An advantage of using PKI algorithms is that PKI algorithms are widely deployed and well understood. An advantage of IBE algorithms is that they overcome some of the inherent limitations with PKI algorithms. Both PKI and IBE public-key encryption schemes may involve the use of symmetric key encryption to improve cryptographic efficiency. Although symmetric keys may be involved in such public-key encryption schemes, these schemes are generally referred to herein as public-key schemes for clarity.

When symmetric-keys are used in system 10, any suitable symmetric key cryptographic approach may be used. Suitable symmetric key algorithms include AES (Advanced Encryption Standard), DES (Data Encryption Standard), Triple-DES, etc.

The equipment in system 10 may be used to perform authentication, signature, and encryption operations using corresponding authentication key information, digital signature key information, and encryption key information. Key information may be stored on storage and processing circuitry 24 of security device 20. Encryption key information for device 20 may be provided using IBE private key server 16. Authentication key information and signing key information may be generated on device 20 or elsewhere. Certificate authorities 30 and 34 may be used to generate authentication key certificates and signature key certificates. An authentication certificate may be used to associate a particular user with an authentication key. A digital signature certificate may be used to associate a particular user with a signing key.

Authentication key storage and verification service 28 and/or authentication key certificate authority 30 may be used to provide authentication key information to device 20. A tamper-proof enclosure 32 may be used to protect some or all of the circuitry and data on authentication key certificate authority 30 (e.g., private keys of the certificate authority). Signing key certificate authority 34 may have a tamper-proof enclosure 36 that protects some or all of the circuitry and data on signing key certificate authority 34 (e.g., the private key of the signing key certificate authority).

Various computing devices may be used in system 10. For example, computing equipment may be used to implement the functions of a server or other computer equipment at key generator 16, service 28, and certificate authorities 30 and 34. Such servers may be connected to the network 14 as an independent third-party service, may be part of the infrastructure of network 14, may be associated with a given user's organization, may be co-located with a user, key generator, or other equipment, or may used at more than one of these locations. These are merely illustrative arrangements which need not be mutually exclusive.

A server may be formed using a single computer or multiple computers. Multiple servers may be implemented on one computer. If desired, the functions of a single server may be provided by computers that are distributed over a number of different physical locations. The functions implemented using servers in system 10 may generally be performed using other computer equipment configurations if desired, but the computing equipment for implementing these functions is sometimes referred to as a "server" or "servers."

A sender may send a message to a given recipient over system 10 using any suitable messaging format. For example, an email message, an instant message (e.g., an AOL instant message, a Yahoo instant message, an MSN Messenger instant message, and ICQ instant message, an IBM/Lotus Sametime instant message, etc.), or other electronic message may be sent.

During operation of system 10, certain entities such as IBE private key server 16, authentication key storage and verification service 28, authentication key certificate authority 30, and signing key certificate authority 34 may need to verify that a given party has permission to obtain a key or certificate or to perform other functions. In general, the entity performing such authentication and authorization processes may use any suitable manual or automatic techniques. For example, a key such as an authentication key may be used to prove a party's identity. In addition, a party may be asked to fax or mail a letter to an authenticating entity on the party's official letterhead, which is examined for authenticity by personnel or automated equipment at the authenticating entity. As another example, biometric identification techniques (e.g., fingerprint analysis, eye-scanning, handprint or voiceprint analysis, facial recognition methods, or in-person identification checks) may be used. A party may provide credentials in the form of a pre-established ID and password.

In system 10, certificate authorities may create digital certificates. Digital certificates may be used to reliably associate user identities with corresponding public keys. If desired, digital certificates may be provided using a hierarchical arrangement. For example, a root certificate authority may sign a certificate of a lower certificate authority, which in turn signs another certificate containing the public key and ID for a particular user. In this example, there are three levels involved in the hierarchy. In general, any suitable number of levels may be used. Suitable approaches for implementing hierarchical arrangements for digital certificates are well known, so are not discussed in detail herein.

Digital signatures (e.g., signatures from a certificate authority or other entity that use private keys and that can be verified using matching public keys) may be used to ensure that a message or other signed information is associated with a particular party. Sometimes an authentication process in system 10 may involve the generation of a ticket such as a Kerberos ticket or other proof of authorization. Authentication operations are generally described herein without need to distinguish between information such as ticket information that is derived from or based on credential information and the underlying ID, password, key, or other credential information on which the derived information is based.

For ease of interfacing with existing encryption mechanisms and in other contexts, it may sometimes be desired to use a "two-step" encryption technique in which a first key (e.g., a symmetric key) is used to encrypt the contents of a message and a second key is used to encrypt the first key. During decryption, the second key is used to decrypt the encrypted version of the first key, which may then be used to unlock the message contents. These two-step processes (and analogous higher-order multi-step processes) may be more efficient than "pure" or "single step" encryption algorithms and may be used if desired. For clarity, the present invention is described in the context of single-step algorithms.

Security device 20 is preferably provided using a housing such as a removable card or USB key housing that allows security device 20 to be installed or uninstalled by a relatively unsophisticated user. If desired, security device 20 may be built into a larger device (e.g., a cellular telephone) and may be more difficult to remove or may only be removable by a technician. When security device 20 is provided using a small housing that is portable and that can be installed an uninstalled by a user, security device 20 can be carried with a user from computer to computer. As an example, a user who needs to digitally sign messages at work can install security device 20 in a slot or port on a desktop computer at work. When leaving the workplace, the user can remove the security device 20, so that messages can be digitally signed from another computer at home or in a hotel.

Figure 2:
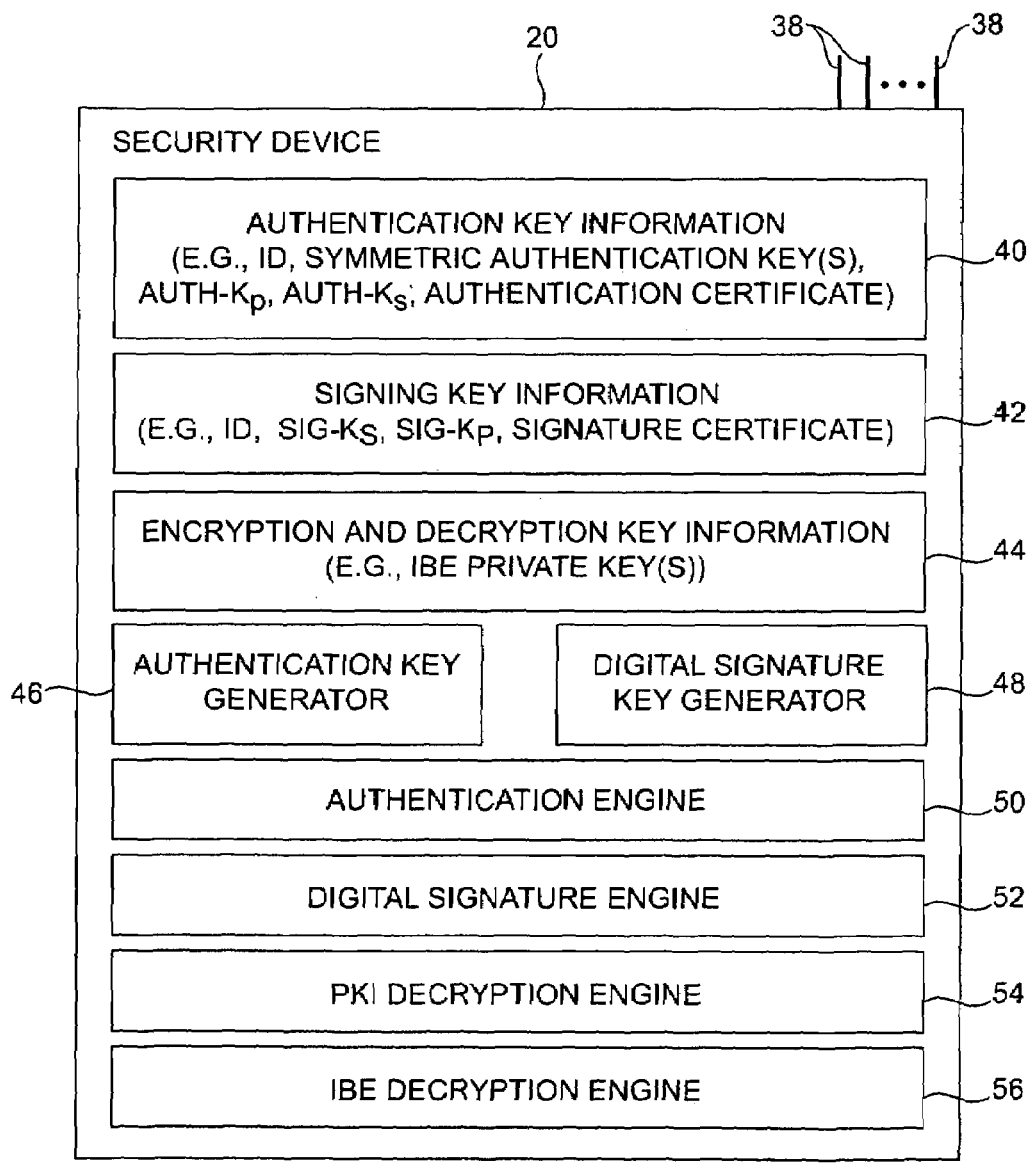
FIG. 2 is a diagram of an illustrative security device in accordance with the present invention.

An illustrative security device 20 is shown in FIG. 2. As shown in FIG. 2, security device 20 may have input/output pins 38. When plugged into a card reader or other suitable slot or mating structure, pins 38 make electrical contact with the circuitry of the computing equipment 12 into which the security device 20 is being installed. In a typical scenario, security device 20 is a PC card, smart card, or USB key that is installed in a card slot on a computer (e.g., a PC card slot) or a USB port. Input/output connectors 38 may be PC card connectors, USB port connectors, or any other suitable conductive structures for interconnecting the circuitry of device 20 and the computing equipment 12 into which device 20 is installed. Device 20 may receive power from the computing equipment 12 through input/output connections 38. If desired, device 20 may operate on an internal battery. If device 20 has an internal power source such as a battery, input/output communications may be formed using a wireless communications path instead of or in addition to a wired path. As an example, the signals that would otherwise be conveyed over input/output connections 38 may be linked to the computing equipment 12 over a low-power wireless connection such as a Bluetooth connection.

Security device 20 may have authentication key information 40, signing key information 42, and encryption and decryption key information 44. Authentication key information 40 may include user authentication identification (ID) information and one or more symmetric authentication keys. Any suitable ID may be used. For example, an authentication ID may be a user's name, title, email address, a serial number for device 20, identifying characters, etc. Multiple IDs may be used if desired. In general, the particular format used for the ID information in authentication key information 40 and the other information used by a user's security device 20 and computing equipment 12 is not critical. Any suitable ID format may be used.

If desired, public-key/private-key authentication key pairs may also be used for authentication instead of or in addition to using symmetric authentication keys. With a public key pair arrangement, authentication key information 40 may include one or more authentication public keys Auth-Kp and one or more corresponding authentication private keys Auth-Ks. An authentication certificate may be stored as part of authentication key information 40. Authentication certificates typically contain an authentication public key Auth-Kp and corresponding authentication ID and are digitally signed by a trusted authentication key certificate authority 30. The authentication certificate can be used to prove that the authentication public key Auth-Kp is associated with the user whose ID is in the authentication certificate.

Signing key information 42 may include a signature ID for the user and one or more public-key/private-key signing key pairs. In a signing key pair, the public signing key is Sig-Kp and the private signing key is Sig-Ks. The key Sig-Ks is used for forming digital signatures. The key Sig-Kp is used by others to verify that a signature formed using Sig-Ks is valid. Information 42 may include a signature certificate that includes the signature ID and the public signing key Sig-Kp digitally signed by a trusted signing key certificate authority 34. The signature certificate may be used to prove that the signature public key Sig-Kp is associated with the ID in the signature certificate. The ID used in the signature certificate may be the same as or different than the ID used in the authentication certificate.

Encryption and Decryption key information 44 may include PKI and IBE key information. For example, encryption and decryption key information 44 may include the user's PKI private key to use in decrypting messages that have been encrypted using the user's corresponding PKI public key. Information 44 may also include an IBE private key for the user associated with security device 20. The user can use this IBE private key to decrypt IBE-encrypted messages that have been encrypted for the user using the user's IBE public key.

IBE private keys may be generated using a master secret s at IBE private key server 16 (FIG. 1). After being generated at server 16, the IBE private key may be delivered securely to security device 20 and stored in its tamper proof enclosure 22 (FIG. 1). Authentication public-key/private key pairs and digital signature public-key/private key pairs may be generated off of device 20 and delivered securely to device 20. Preferably, device 20 has an authentication key generator 46 that is used to generate the authentication public and private keys Auth-Kp and Auth-Ks on device 20 and a digital signature key generator 48 that is used to generate the signature public key and private keys Sig-Kp and Sig-Ks on device 20. When the keys Auth-Ks and Sig-Ks are generated internally to device 20, these keys need not be transmitted through a potentially insecure environment. Rather, keys Auth-Ks and Sig-Ks may be retained and used in secure storage and processing circuitry in tamper-proof enclosure 22.

Authentication engine 50 may be used by device 20 to support authentication operations (e.g., in forming authentication information from ID and key information). Digital signature engine 52 may be used to digitally sign messages. Authentication engine 50 and digital signature engine 52 may, for example, use PKI techniques for authentication operations and forming digital signatures. If desired, IBE techniques may be used for authentication and signatures.

PKI decryption engine 54 may be used to decrypt PKI-encrypted messages that are provided to device 20. IBE decryption engine 56 may be used to decrypt IBE-encrypted messages that are provided to device 20.

If desired, some of the processing steps performed by authentication key generator 46, digital signature key generator 48, and engines 50, 52, 54, and 56 may be implemented using a distributed architecture in which some operations are performed by the circuitry 24 of device 20 and some of the operations are performed by the circuitry 26 of computing equipment 12 or other hardware external to device 20. Sharing the processing load between device 20 and other processors in this way helps to ensure that device 20 does not become too complex and helps to maintain the size of circuitry 24 small and the cost of tamper-proof enclosure 22 reasonable. When sharing the processing load, information that is to be kept secure may be retained within device 20, whereas other information may be transferred in and out of device 20 as needed. If desired, all or substantially all processing may take place on device 20 by providing a sufficiently large processor in circuitry 24 (FIG. 1).

The IBE decryption engine 56 may be used to implement any suitable IBE cryptographic algorithm. One such scheme is based on quadratic residues (see, e.g., "An Identity Based Encryption Scheme Based on Quadratic Residues," Eighth IMA International Conference on Cryptography and Coding, December 2001, Royal Agricultural College, Cirencester, UK, by Clifford Cocks). Another suitable scheme, called Boneh-Franklin IBE, is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231-229, August 2001). See also http://eprint.iacr.org/2001/090 by Dan Boneh and Matthew Franklin. With the Boneh-Franklin approach, IBE encryption is based on the properties of bilinear maps such as a Weil Pairing or Tate Paring. For clarity, aspects of the present invention will sometimes be described in the context of an identity-based-encryption scheme such as the elliptic curve implementation described by Boneh and Franklin. This is, however, merely illustrative. Any suitable approach for IBE encryption may be used with system 10 if desired.

Initially, when the system is set up, IBE private key generators (e.g., IBE private key generators such as IBE private key generator 16 of FIG. 1) each obtain or generate a master secret s. For example, each private key generator may create a master secret from a number that is randomly generated at the private key generator by a processor housed inside a tamper-proof enclosure such as tamper-proof enclosure 18. The master secret may also be produced off-site and delivered to the private key generator 16.

The master secret (also sometimes referred to as a secret master key or a master key) is secret information that is used by the private key generator 16 to generate IBE private keys. Once the IBE private key for a user has been transferred to device 20 and stored as part of encryption and decryption information 44, this IBE private key can be used by the decryption engine 56 on that device 20 to decrypt IBE-encrypted messages sent to the user of device 20.

During set-up operations in system 10, the IBE private key generator 16 may use the master secret in generating IBE public parameter information. In the identity-based encryption approach of the above-mentioned work of Boneh et al., the public parameter information that is generated includes public parameters P and sP. The parameter P may first be generated by the IBE private key generator (e.g., using a random number generator). The parameter sP may then be generated by the IBE private key generator. The "multiplication" of s by P in the Boneh and Franklin work is accomplished using the multiplication of integers with points on elliptic curves. While multiplication (calculating sP) is straightforward, the inverse operation (determining s from knowledge of P and sP) is so computationally expensive that it is impractical for an attacker to obtain s in this way.

The IBE public parameter information (e.g., the parameters P and sP in an identity-based encryption process based on elliptic curves) may be numbers. In general, there is an equivalency between numbers, letters, symbols, and other such schemes for representing keys and other information. Sometimes certain information (e.g., the master secret or public parameters) will be described as being in number form and sometimes certain information (e.g., a user's identity) may be described as being at least partly in character form (e.g., in the form of an email address). Because of the inherent equivalency between these different representational schemes, the techniques involved in converting letters or symbols into numbers or for representing multiple numbers or strings as a single number or other such operations are not described in detail herein.

After the public parameter information (e.g., P and sP) has been determined, the IBE private key generator 16 may make this information available to users (sometimes called senders) who desire to IBE-encrypt a message in system 10. The public parameter information may be provided to the senders using any suitable technique. For example, potential recipients may send the public parameter information to senders in email messages or use other suitable peer-to-peer distribution schemes. If desired, the private key generator 16 may publish the public parameter information by using a directory service or by placing the public parameter information on a particular host server that a sender can reach using an associated domain name or other suitable service name that is generated based on the recipient's public key (e.g., using a known service-name generation rule). These are merely illustrative techniques for making the public parameter information available to users in system 10. Any suitable technique for making the public parameter information available to the users may be used if desired.

If the public parameter information includes more than one parameter, the parameters may be provided to the users together or separately. For example, parameters P and sP may be provided to a user together in a single transmission or separately in two transmissions. If parameters P and sP are provided separately, each parameter may be distributed using a different distribution mechanism. For example, P may be provided to a user over a secure sockets layer path and sP may be conveyed to the user in an encrypted email message. As another example, all users may know P in advance (e.g., P may be built into user software) and sP may be distributed electronically. If desired, P may be the same for all or substantially all users in the system. Moreover, P and sP may be combined to form the equivalent of a single number or parameter or may be subdivided (e.g., to form three or more public parameter sub-parts). If desired, some of the public parameter information may be distributed manually (e.g., by printed mail or by distributing a diskette or other computer-readable media to the user).

Once the IBE public parameter information (e.g., public parameters P and sP) has been provided to a user (i.e., a sender) who desires to send an IBE-encrypted message to another user (i.e., a recipient), the sender may encrypt and send the message to the recipient. An IBE encryption algorithm in an IBE encryption engine on the sender's computing equipment 12 may be used to encrypt the message. The encryption engine may use the public parameter information (e.g., P and sP) and an appropriate IBE public key to encrypt the message. For example, the encryption engine may encrypt the message using the IBE public key associated with the recipient.

When the IBE-encrypted message is received, the IBE private key that corresponds to the IBE public key is used to decrypt the message. The IBE private key is generated by the IBE private key generator 16 and stored on device 20. The IBE decryption engine 56 that implements the IBE decryption algorithm may be used to decrypt the IBE-encrypted message. The decryption engine takes as inputs the IBE-encrypted message and the IBE private key and produces the unencrypted version of the message as an output. The decryption engine 56 may be implemented entirely using the circuitry 24 of device 20 or may be partly implemented on circuitry 24 and partly on external circuitry such as circuitry 26 of computing equipment 12.

IBE encryption and decryption engines may use software to implement the desired IBE encryption and decryption algorithms. Such software may be provided on device 20, may be provided to equipment in the system 10 as part of the software applications used by senders and recipients (e.g., email messaging software), as part of message management software provided to organizations in system 10, as part of a mail server package, as part of an operating system, as part of a package of server administration tools, as a downloadable program or plug-in that is available to senders, recipients, and other parties in system 10, or using any other suitable technique.

Identity-based encryption (IBE) is so named because the encryption process at the sender uses an IBE public key Q that is generally based on the recipient's identity. The identity of a user in an IBE encryption scheme may be represented by any suitable string, number, or symbol. For example, the identity of a message recipient may be represented by or based on that recipient's email address, name, or social security number. IBE private key generator 16 may generate an IBE private key for appropriate users based on the IBE public keys (the Q's) of each of these users (e.g., based on the users' identities).

The form of IBE public key Q that is used for a given IBE scheme depends on the security features that are desired. For example, user privileges may be made to automatically expire by automatically concatenating a validity period (e.g., a date or date range such as the current day of the year and year, the current month, starting and ending dates such as Jan. 2, 2003-Jan. 10, 2003, or any other suitable time-related date-stamp information) with each user's email address to form Q values based not only on the users' identities (i.e., email addresses) but also validity period information. The validity period acts as an access policy for the encrypted message that is more generally applicable than the user-specific email address identity information.

When a validity period is used as part of an IBE public key Q, it is not permissible to access the contents of a message encrypted using that Q if the current date does not fall within the specified validity period. This policy may be enforced by the private key generators such as private key generator 16. If the current date is not within the validity period specified in the public key, a private key generator will refuse to generate and provide an otherwise authorized key requester (e.g., a message recipient or authorized agent for the message recipient associated with device 20) with a copy of the corresponding private key that is needed to decrypt the message. With this approach, IBE private keys do not have unlimited lifetimes, which enhances the security of the system.

As another example, users' privileges may be restricted based on security clearance level. With this approach, security clearance level information may be concatenated or otherwise added to each user's email address when forming the public keys Q (i.e., Q=joe@navy.com|top_secret, etc.). These approaches are merely illustrative of the ways in which policy-based criteria may be added to a user identity such as a user email address when forming the IBE public key for each user (e.g., the Q for each user). Any suitable approach for forming IBE public keys based on user identity information and additional criteria may be used if desired.

PKI keys such as PKI signing keys and PKI authentication keys may also be assigned validity periods. With one suitable arrangement, signing keys may be given short validity periods (e.g., one week). When the signing keys have relatively short expiration periods, users whose privileges have expired will not be able to digitally sign messages for more than the short expiration period. The use of short validity periods for signature public-key/private-key pairs therefore enhances the integrity of the system. To further enhance the system's integrity, users who are no longer permitted to use a given signature key pair to digitally sign a message may be listed on a revocation list. Users can check the revocation list as part of the signature verification process. If a user appears on the revocation list, the digital signatures of that user need not be treated as valid digital signatures.

Authentication keys can also be provided with validity periods. As an example, authentication keys may be automatically expired once per year.

Signature key information and IBE private keys may be distributed following authentication using an authentication key. With this arrangement, a user's PKI digital signature capabilities and the user's IBE private key decryption capabilities can be blocked by revoking the authentication key for that user. By requiring that valid authentication key information 40 be provided by device 20 before an up-to-date signature key certificate or IBE decryption key is provided to the device over network 14, the authentication key information 40 can be used as part of a key distribution control mechanism. Once authentication credentials have been revoked, the user of device 20 will no longer be able to receive up-to-date IBE private keys and/or PKI signing keys. This limits the maximum number of revoked keys that are in circulation in system 10 and thereby reduces the size of any revocation lists that are used to keep track of which users' privileges have been revoked in the system.

In system 10, certain information is made freely available to all or most parties. For example, IBE public parameter information such as the values of P and sP in a typical Boneh-Franklin IBE arrangement may be made publicly available. To perform their intended functions as certificate authorities, signing key certificate authority 34 and authentication key certificate authority 30 digitally sign certificates with the private key portion of a public-key/private-key pair. The public key portions of these pairs (i.e., signing key certificate authority public key SCA-Kp and authentication key certificate authority public key ACA-Kp) are publicly available. The corresponding private keys (SCA-Ks and ACA-Ks) are maintained secret by certificate authorities 34 and 30 respectively.

The authentication key information 40, signing key information 42, and encryption and decryption key information 44 is generated during setup operations. When validity period information is used to automatically expire keys such as the authentication keys, signing keys, and IBE keys, these keys must also be periodically refreshed.

Figure 3A:
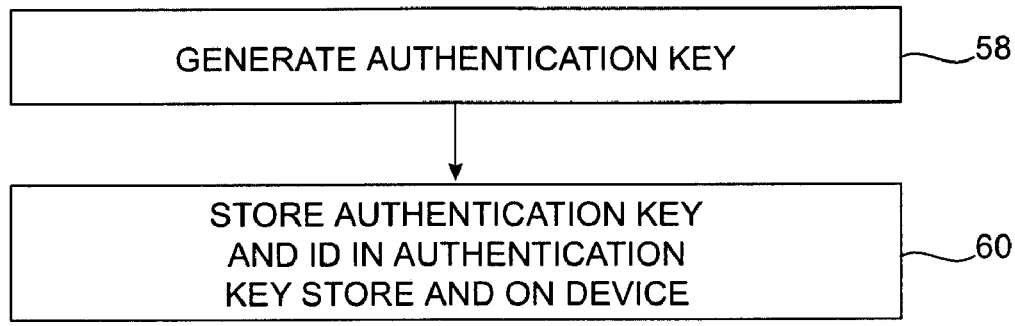
FIG. 3A is a flow chart of illustrative steps involved in setting up symmetric key authentication information for a security device in accordance with the present invention.
Figure 3B:
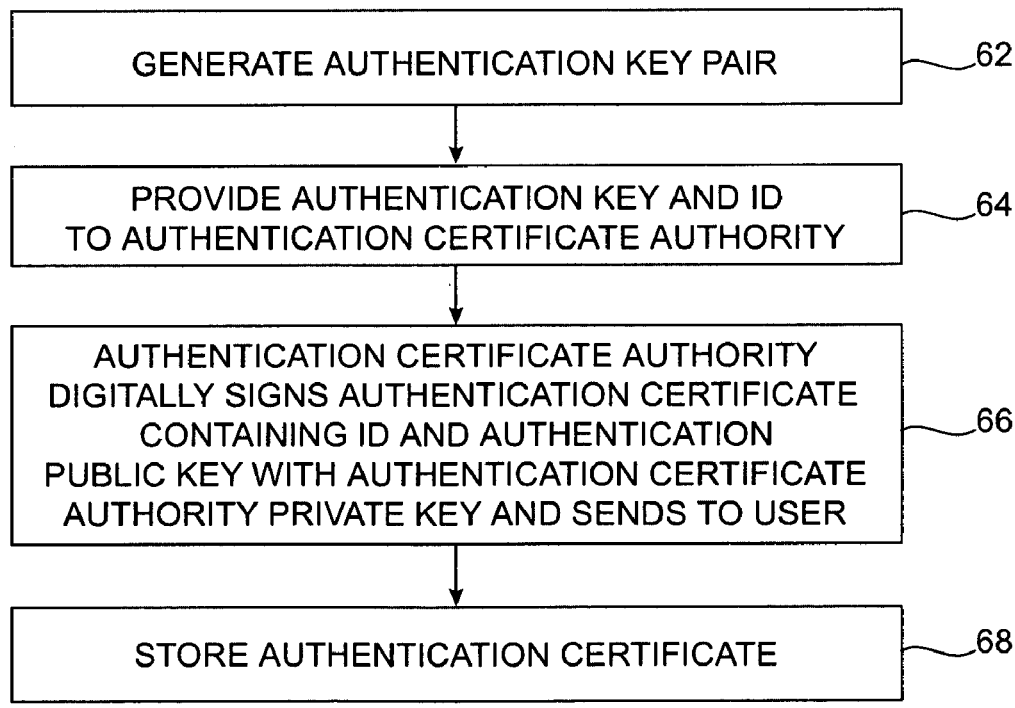
FIG. 3B is a flow chart of illustrative steps involved in setting up public-key authentication information for a security device in accordance with the present invention.

Authentication key information may be set up and refreshed using a symmetric key arrangement or using a public-key/private-key pair arrangement. Illustrative steps involved in setting up and refreshing authentication keys based on a symmetric key arrangement are shown in FIG. 3A. Illustrative steps involved in setting up and refreshing authentication keys based on a public-key/private-key pair are shown in FIG. 3B. The operations of FIGS. 3A and 3B may be performed initially during a set-up period and later, at suitable intervals, to refresh authentication keys that have expired.

In the symmetric key arrangement of FIG. 3A, a symmetric authentication key is generated at step 58. A random number generator or other suitable arrangement may be used to generate the symmetric key. The symmetric authentication key may be generated using authentication key generator 46 on device 20 or may be generated using external computing equipment. The external computing equipment may be, for example, a computer associated with the issuer of the security device 20. Any suitable string or other information may be used as the symmetric key. As an example, a serial number or a serial number concatenated with a validity period may be used as the symmetric key.

At step 60, the symmetric authentication key that was generated at step 58 and a corresponding authentication ID may be stored in device 20 and in authentication key storage and verification service 28. Security is preferably maintained during the distribution of the authentication ID and the symmetric authentication key. For example, if the ID and/or key are generated outside of device 20, this information is preferably provided to device 20 over a secure path (e.g., a path entirely under the control of a trusted party). Similarly, the transport of the ID and symmetric authentication key to service 28 is also preferably made in a secure fashion using a trusted path and/or delivery mechanism.

The authentication ID may be any suitable identifier for the device 20 and its associated user. As an example, a user's name, email address concatenated with a validity period, a user name in combination with serial number information, or any other suitable ID may be used as the authentication ID for the user of device 20. By storing the authentication ID and corresponding authentication symmetric key on device 20, the user at device 20 can use the authentication ID and authentication symmetric key to form a message authentication code or otherwise form key-based authentication information. The authentication ID and authentication symmetric key are also stored at authentication key storage and verification service 28, so service 28 can be used to verify authentication information that has been created using the symmetric key (e.g., by comparing a symmetric key that is provided to service 20 to a symmetric key stored at service 20 or by using a suitable symmetric key verification engine in verification service 28).

With the public-key/private-key authentication key approach of FIG. 3B, a public-key/private-key authentication key pair is generated at step 62. The key generation process is preferably performed on device 20, so that the authentication private key Auth-Ks need not ever leave the device 20. In environments where Auth-Ks never leaves the tamper-proof enclosure 22 of device 20, there is little risk of unauthorized access to Auth-Ks.

At step 64, the authentication public key Auth-Kp that has been generated and an associated authentication ID for the user are provided to the authentication certificate authority 30. For example, this information may be transmitted from device 20 to authentication key certificate authority electronically over communications network 14 in the form of a certificate request. The authentication ID may contain a validity period (e.g., 1 year).

At step 66, the authentication certificate authority creates and signs an authentication certificate for the user. The authentication certificate contains the authentication ID and the authentication public key Kp for the user at device 20. The authentication certificate is signed by the trusted authentication key certificate authority 30 using the authentication key certificate authority private key Auth-Ks. The authentication key certificate authority 30 returns the signed authentication key certificate to the device 20 over network 14.

At step 68, the user stores the signed authentication key certificate. The authentication key certificate may be stored on device 20 as part of authentication key information 40 or may be stored in another suitable location such as in storage circuitry 26 of the user's computer equipment 20 (FIG. 1).

The establishment of suitable authentication key information 40 at device 20 allows the user at device 20 to use this information to authenticate to the entities in system 10. This allows device 20 to obtain secret key information such as signing key information 42 for forming digital signatures and information 44 for performing IBE decryption operations. This secret key information may be obtained by device 20 during initial setup operations and may be refreshed periodically.

Figure 4:
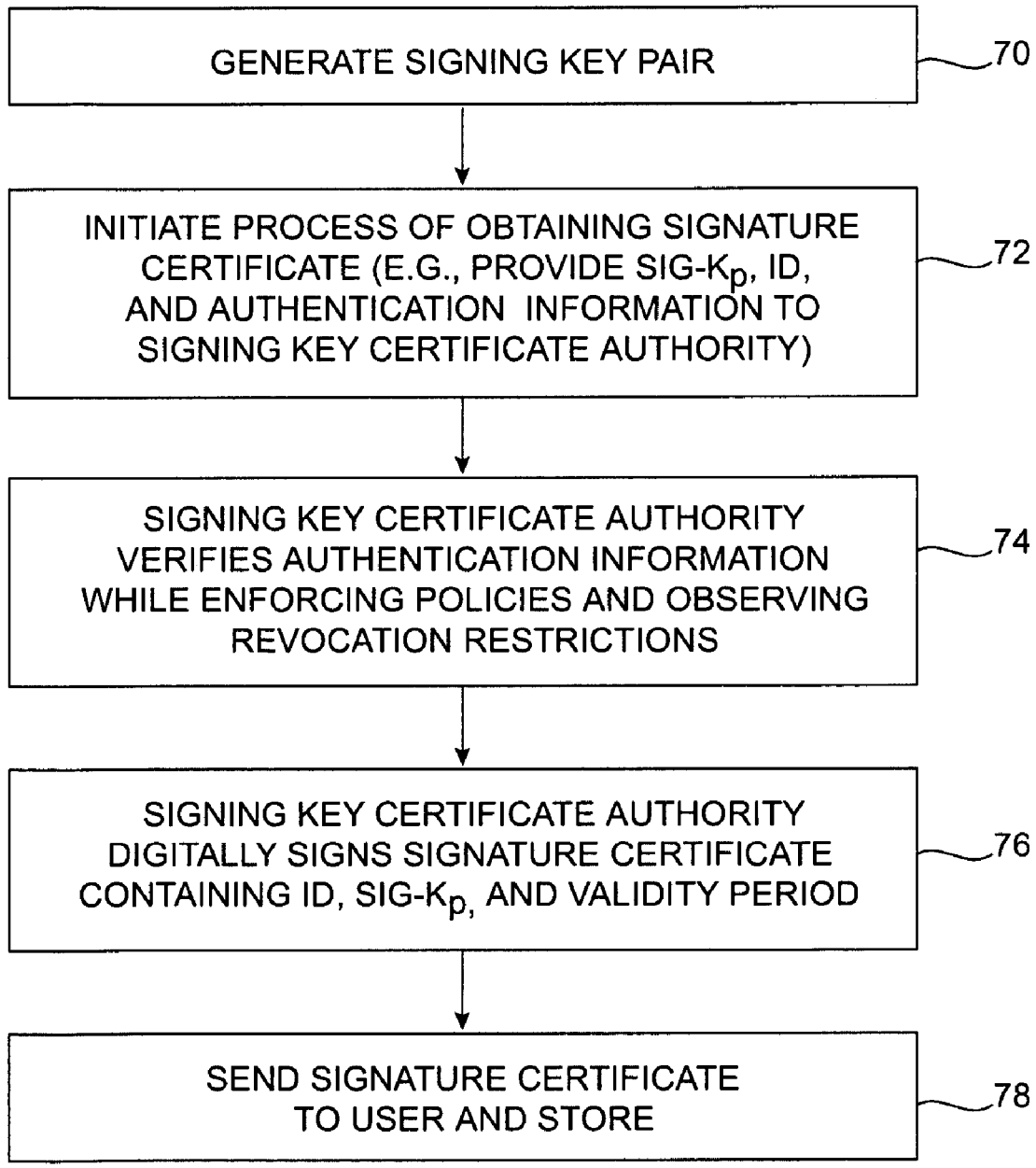
FIG. 4 is a flow chart of illustrative steps involved in setting up digital signature public-key information for a security device in accordance with the present invention.

Illustrative steps involved in setting up and refreshing signing key information for device 20 are shown in FIG. 4.

At step 70, a PKI signing public-key/private-key pair Sig-Kp/Sig-Ks is generated. Device 20 may generate the keys or the keys may be generated externally (e.g., using processing circuitry 26 or other suitable hardware external to device 20). An advantage of generating the signing keys in device 20 is that the user's private signing key Sig-Ks need never leave the tamper-proof enclosure 22. This helps to enhance the security of the system, because the signing key Sig-Ks cannot be intercepted by an attacker. The keys Sig-Ks and Sig-Kp and corresponding signing key identity information (ID) may be stored as signing key information 42 in device 20. Any suitable ID may be used for the signing key identity information (e.g., the user's name, the user's name concatenated with a validity period, etc.). The signing ID may be the same as the authentication ID of authentication key information 40 or the signing ID and authentication ID may be different.

At step 72, the process of obtaining a signature certificate may be initiated. For example, device 20 can formulate a request for a signing key certificate. The signing key request may be sent to signing key certificate authority 34 over communications network 14. In making the request for the signing key certificate, the device 20 may provide the public signing key Sig-Kp, the ID, and authentication information to the signing key certificate authority 34. This information may be provided in the form of a signed certificate request or in any other suitable format. The authentication information is preferably generated using the user's authentication key information. For example, if the authentication key is a symmetric key, the signing ID may be signed using the symmetric authentication key. If the authentication key is based on a public-key/private-key pair, the authentication information may be formed by signing Sig-Kp and the signing ID with the authentication private key Auth-Ks.

At step 74, the signing key certificate authority 34 may verify the authentication information provided by the device 20 at step 72. Keys such as the signing key, authentication key, and IBE key may include policy information (e.g., a validity period, etc.). During step 74, the signing key certificate authority 34 may enforce any such policies that are in use. For example, if the authentication key validity period has expired, the signing key certificate authority 34 can decline to issue a certificate. The signing key certificate authority 34 may also observe any revocation restrictions that have been made. If, for example, the authentication key of the user of device 20 has been revoked, the signing key certification authority can honor that revocation by blocking issuance of the signing key at step 74.

Being able to stop issuance of the signing keys by revoking a user's authentication key enhances the ability of certain organizations to revoke signing keys. For example, consider the situation in which an organization has millions of employees. There are numerous job changes associated with an organization of this size due to the large number of employees joining and leaving the organization and due to the large number of employees who transfer to new positions within the organization. Due to these changes, the size of the revocation list that is used to keep track of revoked signature keys can become large enough that it is a burden for users to download this list to keep up to date on revocations.

When the issuance of signature keys is blocked through revocation of the authentication keys of employees, the size of the revocation list can be made much smaller. This is because the list need only be long enough to list the revocations that have taken place within the relatively short validity period associated with the signing keys (e.g., 1 week) and need not be a cumulative list of revocations. An employee whose authentication key has been revoked will no longer be able to obtain new signing keys after the signing key validity period has expired, so it is not necessary to include this employee in the signature key revocation list after the employee's signature key has expired. The use of valid authentication keys as to regulate distribution of signature keys therefore allows the size of the employee revocation list to be reduced considerably.

The technique used to verify the signature on the authentication information depends on the type of authentication key being used. If a symmetric authentication key is being used, as described in connection with FIG. 3A, verification operations involve verifying the authentication symmetric key by comparing the authentication symmetric key to the copy of the authentication symmetric key stored in authentication key storage 28. The verification service 28 may use a suitable symmetric key verification engine to perform the verification process for the signing certificate authority. If a public-key/private-key authentication key arrangement is being used as described in connection with FIG. 3B, verification operations involve using the authentication certificate and the authentication public key Auth-Kp from the authentication certificate (in authentication information 40 of FIG. 2) to verify the authentication information signature of the user at signing certificate authority 34.

If the signing key certificate authority can successfully authenticate the user at step 74 (e.g., by using Auth-Kp to verify the digital signature on the authentication information provided by device 20), the signing key certificate authority can create and sign a signature certificate for the user at device 20 at step 76. The signing key certificate may include information such as the signing key ID of the user at device 20, the public signing key Sig-Kp, and the validity period associated with the public key Sig-Kp. The signing key certificate authority 34 can digitally sign the signature certificate using the private key of the signing key certificate authority SCA-Ks.

At step 78, the signature certificate may be sent from the signing key certificate authority 34 to the user. The signature certificate can be stored in the device or may be stored on the computing equipment 12 in which the device 20 is installed (e.g., in storage in storage and processing circuitry 26 of FIG. 1).

Figure 5:
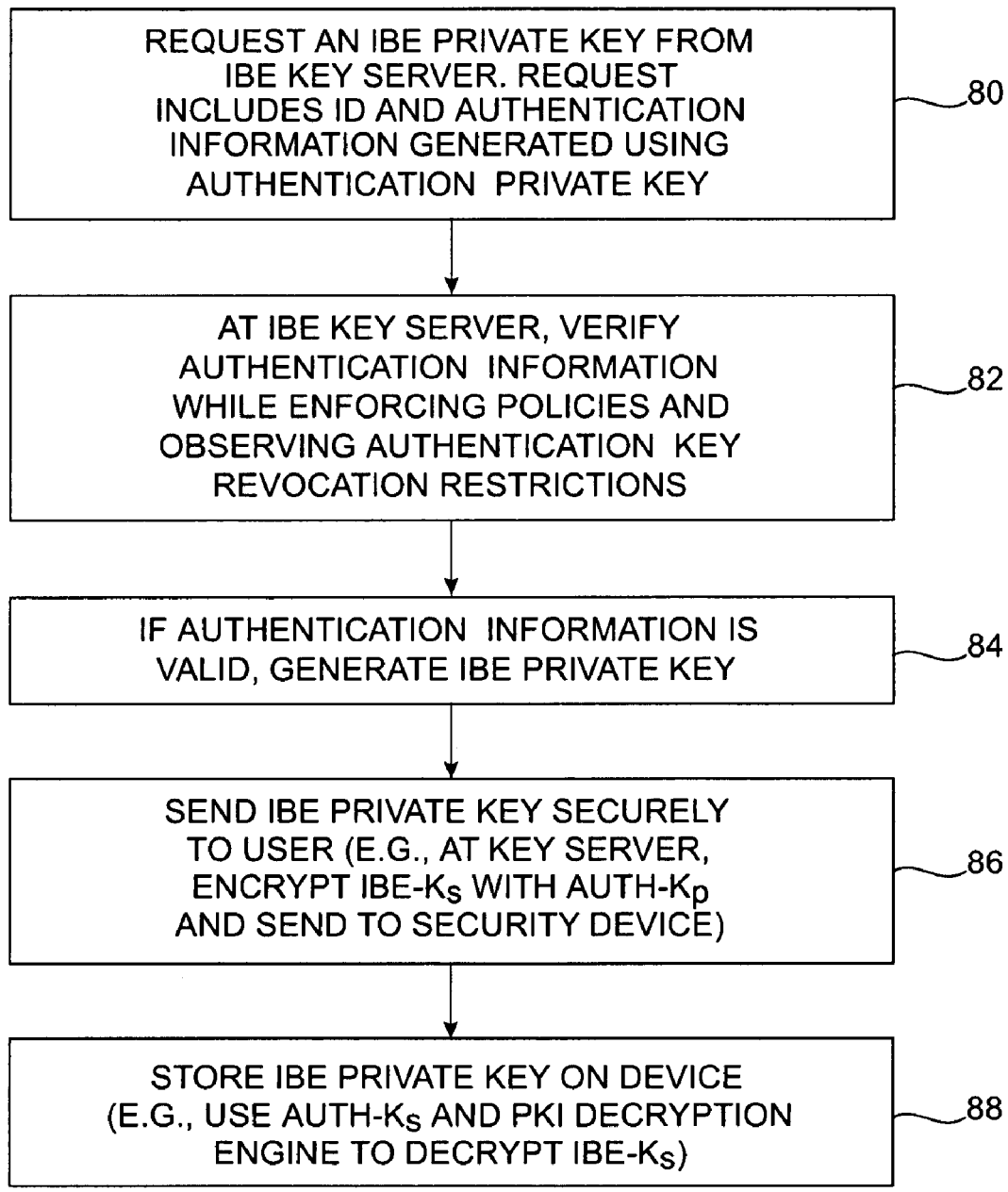
FIG. 5 is a flow chart of illustrative steps involved in setting up IBE key information for a security device in accordance with the present invention.

Illustrative steps in providing an IBE private key to the device 20 are shown in FIG. 5. The process of FIG. 5 may be used during initial setup operations or when refreshing an expired IBE private key on device 20.

At step 80, the user at device 20 may request an IBE private key from IBE private key server 16. The user's authentication information may be used in making the request.

The request of step 80 may be made when the IBE private key is needed to decrypt an incoming IBE-encrypted message, may be made according to a predetermined schedule, or may be made when appropriate according to any other suitable criteria. The request may include the user's ID (e.g., the user's authentication ID) and authentication information. The authentication information may be created using the authentication key. For example, the authentication information may be the ID signed by the authentication key. If a symmetric key is used for authentication, the ID may be signed using the symmetric key. If a public-key/private-key pair is used for authentication, the private authentication key Auth-Ks may be used to sign the ID to form the authentication information.

At step 82, the IBE key server 16 receives the IBE private key request from the device 20. During step 82, the IBE key server 16 may verify the authentication information to determine whether to satisfy the IBE private key request. In verifying the authentication information, the IBE key server may enforce any polices that are embodied by the authentication information. For example, if the authentication information includes a validity period, the IBE private key server 16 can observe the validity period. Requests made after the validity period have expired need not be honored. The IBE key server 16 may also observe any revocations that have been made. If for example, a particular user's authentication key has been revoked by that user's employer, the IBE key server 16 can decline to verify the authentication information.

If the authentication key is a symmetric key, the IBE private key server 16 can verify the authentication information using verification service 28. Service 28 compares the user's symmetric key to the copy of the symmetric key for the user that is stored at service 28. If the keys match, the user can be authenticated. If the authentication information has been signed using a private authentication key Auth-Ks, the IBE private key server 16 can obtain the authentication key certificate for the device 20 (e.g., the authentication key certificate can be transmitted to server 16 by the user). The certificate can be authenticated using the authentication key certificate authority's public key ACA-Kp. After the certificate has been verified, the IBE private key generator can verify the digital signature that the device 20 placed on the authentication information using the authentication public key Auth-Kp from the verified certificate.

If the IBE private key server 16 determines that the authentication information of the device is valid, the IBE private key server 16 can use the master secret s and the identity of the user (ID) to generate an IBE private key IBE-Ks to provide to the user.

The IBE private key generator 16 can provide the IBE private key to the device 20 of the user at step 86. To avoid revealing the IBE private key to attackers, the IBE private key IBE-Ks can be provided to the user of device 20 securely. With one suitable arrangement, an PKI encryption engine is used at IBE private key server 16 to encrypt the IBE private key IBE-Ks using the user's authentication public key Auth-Kp.

At step 88, the device 20 receives the IBE private key IBE-Ks and stores this information as encryption and decryption key information 44 (FIG. 2). If the IBE private key was encrypted using the authentication public key Auth-Kp, device 20 can use the PKI decryption engine 54 and the authentication PKI private key Auth-Ks to decrypt IBE-Ks. Device 20 may perform this decryption at least partly using the processing circuitry 24 in tamper-proof enclosure 22, so the IBE private key need never be revealed outside of device 20.

Figure 6:
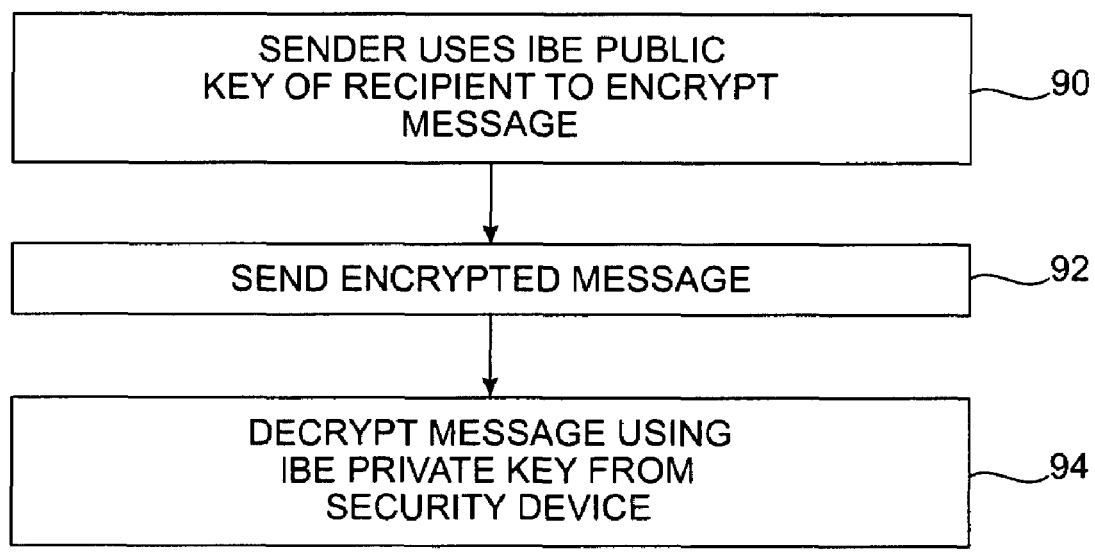
FIG. 6 is a flow chart of illustrative steps involved in using IBE cryptographic techniques and IBE private key information from a security device to communicate securely in accordance with the present invention.

Illustrative steps involved in using identity-based-encryption techniques to communicate in system 10 of FIG. 1 are shown in FIG. 6.

At step 90 a user that desires to transmit information securely to another user encrypts the information to be transmitted. The encrypting user may be, for example, a sender of a message such as user B at computing equipment 12 who desires to send the message to user A over communications network 14. IBE encryption engine 91 of FIG. 1 may be used to encrypt the message at the sender. The inputs to the IBE encryption engine 91 are the unencrypted version of the message, the IBE public parameter information (P and sP in the Boneh-Franklin scheme), the IBE public key Q of the recipient (e.g., the recipient's email address or other identity combined with a validity period). The output of the IBE encryption engine 91 is the IBE-encrypted version of the message.

At step 92, following encryption, the encrypted message is sent to the recipient (user A of FIG. 1 in this example). The message may be sent over network 14.

At step 94, the recipient receives the IBE-encrypted message and uses IBE decryption engine 56 of FIG. 2 to decrypt the message. During decryption operations, the IBE decryption engine 56 uses the IBE private key that has been loaded into device 20 as part of encryption and decryption key information 44. Following IBE decryption operations, the decrypted version of the message may be accessed by the recipient.

Figure 7:
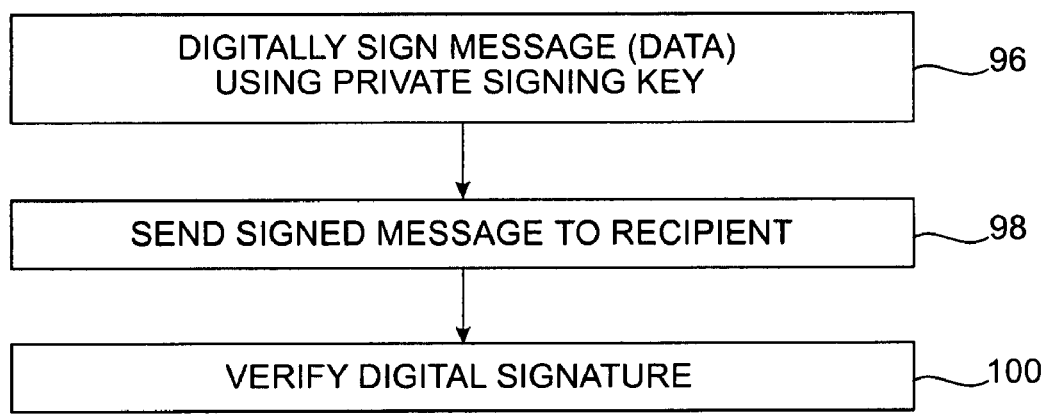
FIG. 7 is a flow chart of illustrative steps involved in using a security device to digitally sign a message in accordance with the present invention.

Illustrative steps involved in using PKI digital signature techniques in system 10 are shown in FIG. 7.

At step 96, a user that desires to digitally sign certain information performs digital signature operations using an appropriate PKI signing key. For example, a user such as user A of FIG. 1 may desire to digitally sign a message for another user such as user B of FIG. 1. User A (a sender) may digitally sign the message and transmit the message to user B (a recipient). During digital signing operations, the sender uses digital signature engine 52 (FIG. 2). The inputs to the digital signature engine 52 are the unsigned version of the message and the signing key Sig-Ks. The output of the digital signature engine is the digitally-signed version of the message. The signing key Sig-Ks is stored in security device 20 as part of signing key information 42 and is retrieved and used by digital signature engine 52 for the digital signature operations of step 96.

At step 98, the digitally signed message may be sent to the recipient over network 14.

At step 100, the recipient receives and verifies the digitally-signed message. For example, the recipient (user B in this example) may use PKI signature verification engine 99 to perform digital signature verification operations. The inputs to PKI signature verification engine 99 are the digitally-signed message from the sender and the signing public key Sig-Kp of the sender. Sig-Kp may be provided to the recipient as part of the digitally-signed message. For example Sig-Kp may be provided in a signature certificate containing the identity of the user and signed by the signing key certificate authority. The validity of the signature certificate can be verified using the signing key certificate authority's public key SCA-Kp during signature verification operations or in advance. The signature certificate and public signing key Sig-Kp are shown as signing key information 42 in FIG. 2.

If verification operations at step 100 are successful, the signature is valid. This proves to the recipient that the message was signed by the sender and has not been tampered with.

The foregoing is merely illustrative of the principles of this invention and various modifications can be made by those skilled in the art without departing from the scope and spirit of the invention.

What is claimed is:

1. A method for supporting identity-based-encryption (IBE) operations in a system in which an IBE private key is provided from an IBE private key server over a communications network to a security device of a user having storage and processing circuitry in a tamper-proof enclosure, comprising:

storing authentication information in the circuitry on the security device in the tamper-proof enclosure;
using the security device and stored authentication information to request the IBE private key from the IBE private key server over the communications network;
at the IBE private key server, verifying the authentication information to determine whether to satisfy the IBE private key request;
if the authentication information is valid, sending the IBE private key to the security device from the IBE private key server over the communications network;
at the security device, storing the IBE private key in the circuitry in the tamper-proof enclosure, wherein using the stored authentication information to request the IBE private key comprises:
  using an authentication private key Auth-Ks of the user to digitally sign at least an identity (ID) of the user at the security device; and
  sending the digitally-signed ID to the IBE private key server as part of the IBE private key request; and
at the IBE private key server, using an authentication public key Auth-Kp of the user to verify the digitally-signed ID; and
at the IBE private key server, using the authentication public key Auth-Kp to encrypt the IBE private key before sending the IBE private key to the security device over the communications network.

2. The method defined in claim 1 further comprising:
at the security device, receiving the IBE private key that has been encrypted using the authentication public key Auth-Kp; and
using the authentication private key Auth-Ks to decrypt the encrypted IBE private key.

* * * * *